(12) United States Patent
Klinkig et al.

(10) Patent No.: US 9,527,462 B2
(45) Date of Patent: Dec. 27, 2016

(54) MOTOR VEHICLE ELECTRICAL SYSTEM AND METHOD FOR OPERATING A MOTOR VEHICLE ELECTRICAL SYSTEM

(75) Inventors: Andreas Klinkig, Cremlingen (DE); Stephan Schwieger, Braunschweig (DE); Rainer Fleischer, Wolfsburg (DE); Torsten Günther, Lehre (DE)

(73) Assignee: VOLKSWAGEN AG, Wolfsburg (DE)

( * ) Notice: Subject to any disclaimer, the term of this patent is extended or adjusted under 35 U.S.C. 154(b) by 847 days.

(21) Appl. No.: 13/992,951

(22) PCT Filed: Nov. 28, 2011

(86) PCT No.: PCT/EP2011/005962
§ 371 (c)(1),
(2), (4) Date: Jun. 10, 2013

(87) PCT Pub. No.: WO2012/076123
PCT Pub. Date: Jun. 14, 2012

(65) Prior Publication Data
US 2013/0264869 A1    Oct. 10, 2013

(30) Foreign Application Priority Data
Dec. 11, 2010  (DE) .................. 10 2010 054 191

(51) Int. Cl.
*B60R 16/033*    (2006.01)
*B60R 16/03*    (2006.01)
(Continued)

(52) U.S. Cl.
CPC ............. *B60R 16/033* (2013.01); *B60R 16/03* (2013.01); *F02N 11/087* (2013.01);
(Continued)

(58) Field of Classification Search
CPC ........ B60R 16/03; B60R 16/033; B60R 25/04; B60R 16/0315; F02N 11/0866; F02N 11/087; F02N 11/0807; F02N 11/103; H02J 7/1438; H02J 7/345; H02J 7/0016; H02J 7/022; B60W 60/08; B60W 20/00; B60L 11/14; H02M 3/156; H02M 3/158; H02M 3/33523; H02M 3/1588; H02M 3/1582; H02M 3/33507; H02M 3/07; H02M 3/33592; H02M 1/4225; H02M 1/4208; H02M 7/217; H02M 7/537; H02M 7/003; H02M 7/5387; H02M 7/538; H02M 7/53871; Y02B 70/1441; Y02B 70/126; Y02B 70/1466; Y02T 10/7005; Y02T 10/7077; Y02T 10/70; Y02E 60/13
(Continued)

(56) References Cited

U.S. PATENT DOCUMENTS 5,256,956 A * 10/1993 Tsuchiya ............... B32B 27/06
320/128
2004/0112320 A1* 6/2004 Bolz ...................... F02N 11/04
123/179.28

(Continued)

FOREIGN PATENT DOCUMENTS

DE     10144282 A1    3/2003
DE     10322875 A1    1/2004
(Continued)

OTHER PUBLICATIONS

Office Action for Chinese Patent Application No. 201180066459.6; Mar. 23, 2015.
(Continued)

*Primary Examiner* — Thienvu Tran
*Assistant Examiner* — Brian K Baxter
(74) *Attorney, Agent, or Firm* — Barnes & Thornburg LLP

(57) ABSTRACT

A motor vehicle electrical system having a starter and a first energy store, which are arranged in a first region of the motor vehicle electrical system, and a generator and a second energy store, which are arranged in a second region of the motor vehicle electrical system, wherein, a switching element is arranged between the first and the second region of the motor vehicle electrical system, wherein the switching element has at least two switching states, wherein, in a first switching state, a current can flow only from the first region toward the second region and, in a second switching state, the first and second region have a through-connection to one another, wherein the second energy store is connected to the generator via a DC/DC converter, wherein, via a second switching element, the starter is connected directly to the second energy store.

10 Claims, 2 Drawing Sheets

(51) Int. Cl.
  *F02N 11/08* (2006.01)
  *H02J 7/14* (2006.01)
  *H02J 7/34* (2006.01)
(52) U.S. Cl.
  CPC ........ *F02N 11/0866* (2013.01); *H02J 7/1438* (2013.01); *H02J 7/345* (2013.01)
(58) Field of Classification Search
  USPC ......... 307/9.1, 10.6; 318/139; 323/222, 271; 363/132, 89; 320/166
  See application file for complete search history.

(56) References Cited

U.S. PATENT DOCUMENTS

| | | | |
|---|---|---|---|
| 2005/0267697 A1 | 12/2005 | Gross et al. | |
| 2006/0137918 A1* | 6/2006 | Dinser | H02J 7/14 180/65.1 |
| 2006/0152180 A1* | 7/2006 | Tahara | B60K 6/26 318/139 |
| 2007/0007057 A1* | 1/2007 | Fujino | B60L 11/06 180/65.23 |
| 2008/0220932 A1* | 9/2008 | Bosch | B60K 6/28 477/3 |
| 2009/0050092 A1* | 2/2009 | Handa | F02N 11/0866 123/179.3 |
| 2009/0056661 A1* | 3/2009 | Cook | F02N 11/0866 123/179.3 |
| 2009/0058371 A1* | 3/2009 | Nakajima | B60R 16/03 320/167 |
| 2010/0108009 A1* | 5/2010 | Holz | B60K 6/48 123/179.3 |
| 2013/0266826 A1* | 10/2013 | Cowperthwaite | H01G 9/28 429/7 |

FOREIGN PATENT DOCUMENTS

| | | |
|---|---|---|
| DE | 10251589 A1 | 5/2004 |
| DE | 10359486 A1 | 7/2005 |
| DE | 102007026164 A1 | 12/2008 |
| DE | 102007062955 A1 | 7/2009 |
| DE | 102008054885 A1 | 6/2010 |
| DE | 102009029335 A1 | 3/2011 |
| DE | 102010014104 A1 | 10/2011 |

OTHER PUBLICATIONS

Search Report for German Patent Application No. 10 2010 054 191.5; Nov. 10, 2011.
Search Report for International Patent Application No. PCT/EP2011/005962; Mar. 5, 2012.

* cited by examiner

MOTOR VEHICLE ELECTRICAL SYSTEM AND METHOD FOR OPERATING A MOTOR VEHICLE ELECTRICAL SYSTEM

PRIORITY CLAIM

This patent application is a U.S. National Phase of International Patent Application No. PCT/EP2011/005962, filed 28 Nov. 2011, which claims priority to German Patent Application No. 10 2010 054 191.5, filed 11 Dec. 2010, the disclosures of which are incorporated herein by reference in their entirety.

FIELD

Disclosed embodiments relate to a motor vehicle electrical system and to a method for operating a motor vehicle electrical system.

BACKGROUND

On account of the problem of CO2 emissions during idling, modern motor vehicles are increasingly being equipped with a start/stop function. In a start/stop function, the motor is turned off, for example when the vehicle stops at a traffic light, in order to save fuel and to reduce CO2 emissions. The motor is restarted by means of the starter in order to continue driving. Since the starter draws current of up to 800 A in order to start the motor, a voltage of up to 6 V is dropped across the internal resistor of the vehicle battery. The available terminal voltage in the electrical system therefore briefly drops to 12 V-6 V=6 V. In addition to the start/stop operation at traffic lights, it is already known to be able to turn off the motor (internal combustion engine) when it is not in use even while the vehicle is moving ("freewheeling motor off"; "start/stop on the move"). Restarting of the motor vehicle is to be ensured in every case.

DE 10 2008 054 885 A1 discloses an apparatus for controlling the supply of power to an electrical system of a vehicle, to which electrical system the load can be connected, comprising a first energy store for providing electrical energy to a starter, a generator for generating a generator voltage and a first controllable switching element which is provided between the first energy store and the generator and which is formed in such a way that it permits current flow only in one direction from the first energy store to the generator during operation of the vehicle. In this case, the switching element can also have a further switching state in which the switching element behaves in the manner of a conductor. The controllable switching element may be a field-effect transistor, in particular a MOSFET. Since field-effect transistors can be switched with low gate voltages and a minimal time delay, it is therefore possible to react quickly to changes in the current flow across the controllable switching element or severe voltage fluctuations in the electrical system. For example, a field-effect transistor or field-effect transistors which are connected in parallel can be arranged such that the forward direction of the intrinsic diode or diodes of the field-effect transistors corresponds to the direction from the first energy store to the generator. This ensures that, when the transistor is turned off, no current can flow from the generator to the first energy store. Secondly, even when the transistor is turned off, some of the current which flows from the first energy store to the electrical system can flow through the intrinsic diodes of the field-effect transistors. The apparatus further comprises a further energy store for providing electrical energy to the loads, the further energy store being arranged in such a way that the first controllable switching element is arranged between firstly the first energy store and secondly the generator and the further energy store. A charging circuit is also provided, wherein the charging circuit is formed, during operation of the vehicle, in such a way that the first energy store is charged to a voltage UE1 which is equal to or greater than the voltage of the second energy store UE2 and is lower than the voltage of the generator. The first energy store may be in the form of a double-layer capacitor and the second energy store may be in the form of a battery. The first energy store provides electrical energy to the starter for a warm start and/or damps voltage fluctuations through the load, wherein the second energy store provides electrical energy for the starter in the event of cold starting.

DE 10 2007 026 164 A1 and DE 103 59 486 A1 likewise disclose motor vehicle electrical systems where the starting energy of a starter is provided by double-layer capacitors.

SUMMARY

Disclosed embodiments are based on the technical problem of improving a motor vehicle electrical system of this generic type in respect of the voltage stability, and also of providing a method for operating a motor vehicle electrical system of this kind.

The technical problem is solved by the subjects having the features of the patent claims. Further embodiments are disclosed in the dependent claims.

To this end, the motor vehicle electrical system comprises a starter and a first energy store which are arranged in a first region of the motor vehicle electrical system, and comprises a generator and a second energy store which are arranged in a second region of the motor vehicle electrical system, wherein a switching element which has at least two switching states is arranged between the first and the second region of the motor vehicle electrical system, wherein current flow is possible only in the direction from the first region to the second region in a first switching state and the first and the second region are through-connected to one another in a second switching state, wherein the second energy store is connected to the generator by means of a DC/DC converter, wherein the starter is connected directly to the second energy store by means of a second switching element. Owing to the DC/DC converter, charge management can be performed in a highly controlled manner, with the result that the second energy store can be charged to the selected voltage level in a very simple manner. Conversely, the second energy store can keep the electrical system voltage for the electrical system load very stable in start phases by means of the DC/DC converter. Owing to the second switching element, it is now additionally possible to connect the second energy store directly to the starter, with the result that the DC/DC converter does not have to be designed for the high starter currents, thus reducing costs.

BRIEF DESCRIPTION OF THE DRAWINGS

The invention will be explained in greater detail below with reference to a disclosed embodiment. In the figures.

DETAILED DESCRIPTION OF THE DISCLOSED EMBODIMENTS

Figure 1:
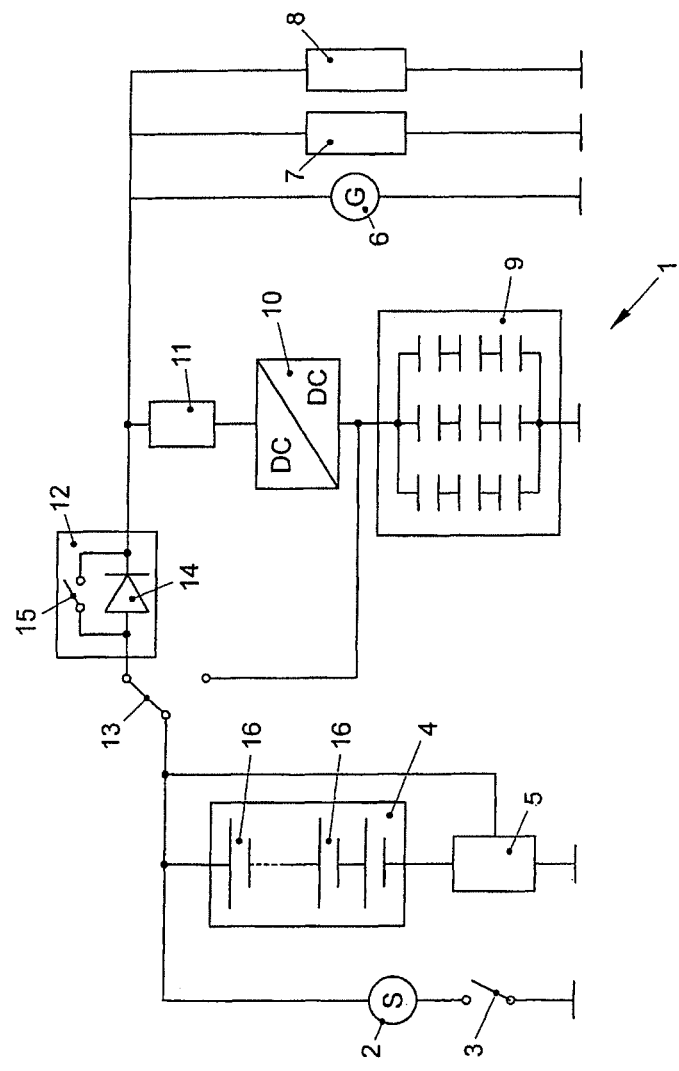
FIG. 1 shows a schematic block diagram of a motor vehicle electrical system.

In at least one disclosed embodiment, a setpoint voltage of the second energy store is greater than a setpoint voltage of the generator and of the first energy store, wherein the starter is connected selectively to the first switching element or directly to the second energy store by means of the second switching element. Owing to the relatively high voltage of the second energy store, more energy can be stored, this increasing both the ability to restart the motor and also the voltage stability of the electrical system. In this case, the DC/DC converter steps the voltage down from the second energy store to the electrical system loads. Selectively connecting the second switching element, which operates as a changeover switch, prevents the relatively high voltage of the second energy store from being able to affect the second region by means of the first switching element.

In another disclosed embodiment, the setpoint voltage of the second energy store is lower than or equal to a setpoint voltage of the generator and of the first energy store, wherein the second energy store is connected to the starter by means of a second switching element. In this case, the second switching element can be in the form of a simple on-switch since the diode of the first switching element is always turned off, since the voltage is stepped up by means of the DC/DC converter, with the result that the voltage of the second energy store, which voltage is applied directly to the starter, is always lower than the voltage across the electrical system loads in the second region.

In yet another disclosed embodiment, the second energy store is in the form of at least one capacitor, optionally a double-layer capacitor. In this case, provision can also be made for the energy store to be in the form of a capacitor pack, wherein in each case a plurality of capacitors are connected in series and these series circuits are connected in parallel. However, it is also possible for the second energy store to be in the form of a battery.

The first energy store may be in the form of a battery which may be composed of a plurality of battery cells. In principle, the first energy store can be formed from capacitors.

In a further disclosed embodiment, the first switching element is in the form of a MOSFET.

In still another disclosed embodiment, the first energy store has an associated diagnosis module as a function of which the first and/or second switching element can be actuated. The diagnosis module can detect, for example, the current from the energy store and/or determine the SOC (State of Charge) and/or the SOH (State of Health). If the diagnosis module then identifies a defect (for example deficient state of charge or line break between the battery cells), the second energy store is connected to the starter. The diagnosis module can likewise through-connect the first and second region by means of the first switching element if the first energy store has to be charged by the generator. In this case, the diagnosis module can directly switch the switching elements or provide its data to a superordinate controller.

In yet another disclosed embodiment, the second switching element is in the form of an electrically isolating switching element in order to thus reliably preclude the electrical system from being affected. The second switching element is, for example, in the form of a power relay.

In a further disclosed embodiment, the motor vehicle electrical system is formed with a controller by means of which an automatic start/stop system can be implemented.

The automatic start/stop system can, for example, be integrated in a motor controller. In this case, the automatic start/stop system optionally also accesses the data in the diagnosis module, with the result that, for example, the automatic start/stop system is deactivated in the case of a poor state of charge of the first energy store.

The method for operating an above-disclosed motor vehicle electrical system is such that, in the event of a defect in the first energy store, the starter is connected directly to the second energy store by means of the second switching element and the starting energy is provided by the second energy store.

In another disclosed embodiment, when starting from the first energy store, the first switching element is switched to the first switching state. As a result, the electrical system is decoupled from the starter and voltage drops in the electrical system are avoided.

In still another disclosed embodiment, the first switching element is switched to the second switching state in order to charge the first energy store using the excited generator.

The motor vehicle electrical system 1 according to FIG. 1 comprises a starter 2, a starter switch 3, a first energy store 4 and a diagnosis module 5, these elements each being arranged in a first region of the motor vehicle electrical system 1. Furthermore, the motor vehicle electrical system 1 comprises a generator 6, electrical system loads 7, 8, a second energy store 9, a DC/DC converter 10 and a fuse 11, these elements each being arranged in a second region of the motor vehicle electrical system 1. The motor vehicle electrical system 1 further comprises a first switching element 12 and a second switching element 13. The first switching element 12 comprises two switching states, the functionality of which can be illustrated by a diode 14 and a switch 15 which is arranged parallel to the diode 14. In a first switching state (switch 15 open), current flow is possible only in the direction from the first region to the second region (diode function). In a second switching state (switch 15 closed), the first and the second region are through-connected. In this case, the first switching element 12 can be formed by a real diode 14 with a real switch 15 or by at least one MOSFET of which the intrinsic diode forms the diode 14. The second switching element 13 likewise has two switching states. In a first switching state, the second switching element 13 connects the first energy store 4 to the first switching element 12. In a second switching state, the second switching element 13 connects the first energy store 4 or the starter 2 to the second energy store 9.

The first energy store 4 is in the form of a battery which is composed of a plurality of battery cells 16. However, the first energy store 4 can also be in the form of a monolithic battery. The diagnosis module 5 monitors the functionality of the first energy store 4 and detects, for example, the battery voltage and/or the battery current and/or a battery temperature and then determines an SOC/SOH of the energy store 4. In this case, the voltage level of the first energy store 4 is, for example, 12 V.

The second energy store 9 comprises a capacitor pack, wherein individual capacitors are connected in series and the series circuits are connected in parallel. In this case, the capacitors may be in the form of double-layer capacitors. The voltage level of the second energy store 9 is, for example, 20-24 V.

In this case, the manner of operation of the motor vehicle electrical system 1 is as follows:

In the normal switching mode, the starter 2 is supplied with electrical energy from the first energy store 4. To this end, the first switching element 12 is switched to the first switching state and also the second switching element 13 is switched to the first switching state. This corresponds to the switch positions in FIG. 1. If the starter switch 3 is then closed, the starter 2 will be supplied with current by the first energy store 4. Voltage drops in the first energy store 4 which occur in this case are, in the process, decoupled from the second region with the electrical system loads 7, 8 by the diode 14 since diode 14 is then reverse-biased. The electrical system loads 7, 8 are supplied with power by the second energy store 9, the voltage of which is converted downward to the voltage level of the electrical system loads 7, 8 by the DC/DC converter 10. After the starter 2 has started a motor (not illustrated), the motor can drive the generator 6. After the motor is started, the starter switch 3 is opened again. The DC/DC converter 10 can now be operated in the other direction, with the result that the second energy store 9 is recharged by the generator 6, to which end the DC/DC converter 10 converts the generator voltage upward. If the diagnosis module 5 establishes that the SOC of the first energy store 4 has dropped, the first switching element 12 can be switched to the second switching state. The generator 6 can then charge the first energy store 4.

If the diagnosis module 5, before or during a starting process, detects that the first energy store 4 is not sufficiently charged or has another defect (for example battery cable break, connection break between two battery cells 16 etc.), the second switching element 13 is switched to the second switching state. As a result, the second energy store 9 is connected directly to the first energy store 4 and the starter 2 and can supply the starter 2 with its high voltage of approximately 20-24 V. The high starter current which flows in the process does not have to flow across the DC/DC converter 10 in this case, with the result that the DC/DC converter can be constructed for lower powers. The electrical system loads 7, 8 are likewise supplied with power during the starting process by the second energy store 9, wherein voltage drops can be compensated for by the DC/DC converter 10.

In this case, the switching elements 12, 13 can be actuated by the diagnosis module 5 and/or another controller, for example a motor controller.

It should further be noted that it is also possible, in principle, to charge the first energy store 4 using the second energy store 9 by the second switching element 13 being switched to the second switching state.

In this case, the fuse 11 prevents overloading of the DC/DC converter 10. Another suitable switch-off element, for example a power semiconductor switch or else a relay, can be used instead of a fuse 11. The fuse can be in the form both of an irreversible fuse or a reversible fusible cut-out (PTC).

Figure 2:
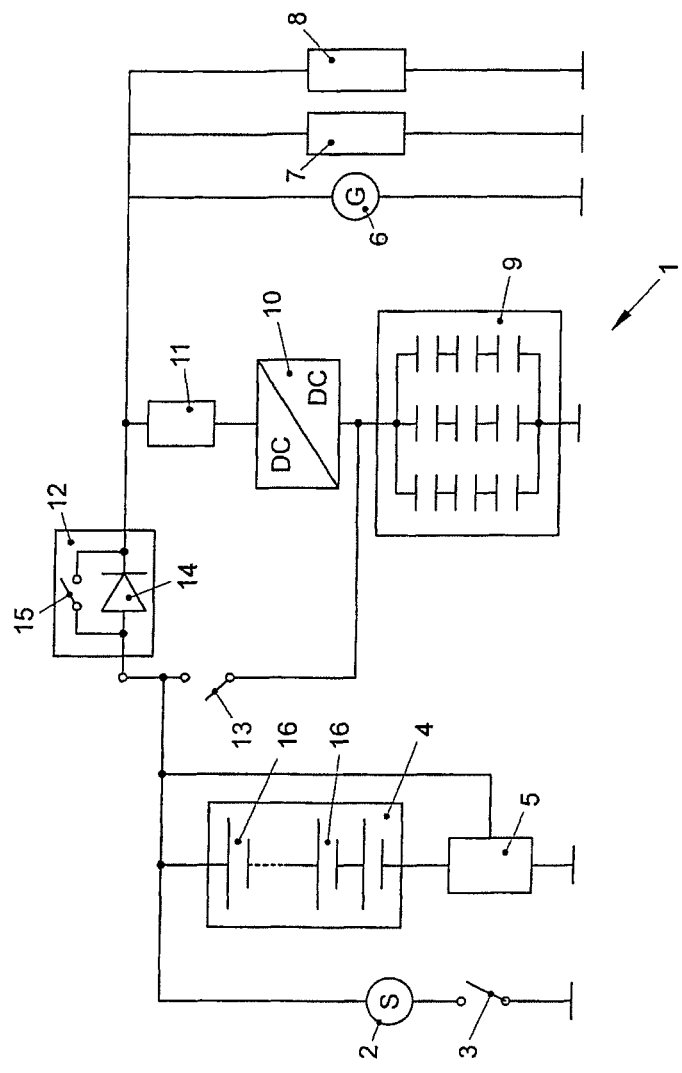
FIG. 2 shows a schematic block diagram of a motor vehicle electrical system in another disclosed embodiment.

FIG. 2 discloses another embodiment of an alternative motor vehicle electrical system 1. In this case, the setpoint voltage of the second energy store 9 is lower than/equal to the setpoint voltage of the generator 6 and of the first energy store 4. In this case, the first switching element 12 is fixedly connected to the starter 2. The second switching element 13 is situated between the second energy store 9 and the starter 2. In the event of a defect in the first energy store 4, the second switching element 13 is closed, with the result that the second energy store 9 can supply current to the starter 2. The DC/DC converter 10 steps up the voltage of the second energy store 9. As a result, the diode 14 is always biased in the reverse direction during the starting process, with the result that when switch 15 is open, the starting process does not affect the second region of the motor vehicle electrical system 1.

LIST OF REFERENCE SYMBOLS

1 Motor vehicle electrical system
2 Starter
3 Starter switch
4 First energy store
5 Diagnosis module
6 Generator
7 Load
8 Load
9 Second energy store
10 DC/DC converter
11 Fuse
12 First switching element
13 Second switching element
14 Diode
15 Switch
16 Battery cells

The invention claimed is:

1. A motor vehicle electrical system comprising;
   a starter arranged in a first region of the motor vehicle electrical system; and
   a first energy store arranged in the first region of the motor vehicle electrical system;
   a generator arranged in a second region of the motor vehicle electrical system;
   a second energy store arranged in the second region of the motor vehicle electrical system; and
   a first switching element which has at least two switching states and is arranged between the first and the second region of the motor vehicle electrical system,
   wherein current flow is possible only in the direction from the first region to the second region in a first switching state and the first and the second region are through-connected to one another in a second switching state, and
   wherein the system further comprises a DC/DC converter and the second energy store is connected to the generator by the DC/DC converter, and
   wherein the starter is connected directly to the second energy store by a second switching element.

2. The motor vehicle electrical system of claim 1, wherein a setpoint voltage of the second energy store is greater than a setpoint voltage of the generator and of the first energy store, wherein the starter is connected selectively to the first switching element or directly to the second energy store by the second switching element.

3. The motor vehicle electrical system of claim 1, wherein the setpoint voltage of the second energy store is lower than or equal to a setpoint voltage of the generator and of the first energy store, wherein the second energy store is connected to the starter by a second switching element.

4. The motor vehicle electrical system of claim 1 wherein the second energy store is at least one capacitor.

5. The motor vehicle electrical system of claim 1 wherein the first energy store is a battery.

6. The motor vehicle electrical system of claim 1 wherein the first switching element is a MOSFET.

7. The motor vehicle electrical system of claim 1, wherein the first energy store has an associated diagnosis module as a function of which the first and/or second switching element can be actuated.

8. The motor vehicle electrical system of claim 1, wherein the second switching element is an electrically isolating switching element.

9. The motor vehicle electrical system of claim 1, wherein the motor vehicle electrical system includes a controller by which an automatic start/stop system is implemented.

10. A method for operating a motor vehicle electrical system wherein a starter and a first energy store are provided in a first region of the motor vehicle and a generator and a second energy store are provided in a second region of the motor vehicle and a first switching element which has at least two switching states is arranged between the first and the second regions, and wherein current flow is possible only in the direction from the first region to the second region in a first switching state and the first and the second region are through-connected to one another in a second switching state, the method comprising:

connecting the generator and the second energy store via a DC/DC converter;

connecting the starter directly to the second energy store by a second switching element, and in the event of a defect in the first energy store, the starter is connected directly to the second energy store by the second switching element and the starting energy is provided by the second energy store.

\* \* \* \* \*